(12) United States Patent
Schmidt

(10) Patent No.: US 9,830,743 B2
(45) Date of Patent: Nov. 28, 2017

(54) VOLUME-PRESERVING SMOOTHING BRUSH

(75) Inventor: Ryan Michael Schmidt, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 720 days.

(21) Appl. No.: 13/438,797

(22) Filed: Apr. 3, 2012

(65) Prior Publication Data

US 2013/0257853 A1 Oct. 3, 2013

(51) Int. Cl.
*G06T 17/20* (2006.01)
*G06T 19/20* (2011.01)

(52) U.S. Cl.
CPC ............. *G06T 17/20* (2013.01); *G06T 19/20* (2013.01); *G06T 2219/2021* (2013.01)

(58) Field of Classification Search
CPC ....... G06T 15/00; G06T 15/005; G06T 17/00; G06T 19/00; G06T 15/08; G06T 19/20; G06T 2219/2016; G06T 7/004; G06T 7/2086; G06T 2219/2021; G06T 7/602
USPC .................................................. 345/619, 419
See application file for complete search history.

(56) References Cited

U.S. PATENT DOCUMENTS

| | | | |
|---|---|---|---|
| 8,411,080 B1* | 4/2013 | Zimmermann | 345/419 |
| 2001/0030646 A1* | 10/2001 | Hubeli | G06T 17/00 345/420 |
| 2002/0089500 A1* | 7/2002 | Jennings, Jr. | G06T 19/20 345/420 |
| 2002/0130858 A1* | 9/2002 | Perry et al. | 345/420 |
| 2004/0075659 A1* | 4/2004 | Taubin | 345/428 |
| 2006/0017721 A1* | 1/2006 | Couture-Gagnon | 345/419 |
| 2006/0290693 A1* | 12/2006 | Zhou | G06T 17/20 345/420 |

OTHER PUBLICATIONS

Kil Y J, Renzulli P, Kreylos O, Hamann B, Monno G, Staadt O, "3D warp brush modeling," Computer & Graphics, vol. 30, Issue 4, Aug. 2006, pp. 610-618.*

* cited by examiner

*Primary Examiner* — Ke Xiao
*Assistant Examiner* — Kim-Thanh T Tran
(74) *Attorney, Agent, or Firm* — Artegis Law Group, LLP

(57) ABSTRACT

A system and method are disclosed for implementing a volume-preserving mesh smoothing brush. The volume-preserving mesh smoothing brush first computes modified positions of vertices of a 3D mesh. A change in the volume of the region of the 3D mesh smoothed by the volume-preserving mesh smoothing brush is estimated. Then updated positions of the vertices are computed based on the estimated change in the volume. The volume-preserving mesh smoothing brush effectively rounds the brushed area. During each smoothing iteration, the positions of the vertices are updated to smooth the 3D mesh while also approximately preserving the volume of the 3D mesh.

21 Claims, 10 Drawing Sheets

3D Shaded Mesh Modified Using the Conventional Smoothing Brush
125

Smoothed Region 120

VOLUME-PRESERVING SMOOTHING BRUSH

BACKGROUND

Technical Field

The present disclosure relates generally to computer-aided design (CAD) and, more specifically, to a volume-preserving smoothing brush used to edit a three-dimensional (3D) object.

Description of the Related Art

Many CAD programs, such as 3D surface-sculpting systems, allow a user to edit a 3D object using a set of brushes, where each brush is metaphorically similar to paint-brush tools used in an image editor such as Adobe® Photoshop®. A 3D brush has an area-of-application, i.e., the area of the 3D object within the boundary of the 3D brush, and applies some operation within the area. In addition to performing painting operations, 3D brushes may also be used to modify the shape of the 3D object.

One conventional type of 3D brush is the smoothing brush, which smoothes out details in the underlying surface by changing positions of vertices of a mesh that represents the 3D object. The effect of the conventional smoothing brush is to shrink or flatten the brushed area, thereby reducing the volume of the smoothed 3D object compared with the original 3D object.

What is needed in the art are improved techniques for computing updated positions of vertices of a 3D mesh when a smoothing brush is applied to the 3D mesh and the volume of the 3D mesh is reduced.

SUMMARY

The present invention generally provides a system and method for implementing a volume-preserving mesh smoothing brush. The volume-preserving mesh smoothing brush first computes modified positions of vertices of a 3D mesh. An estimated change in the volume of the region of the 3D mesh smoothed by the volume-preserving mesh smoothing brush is computed. Then updated positions of the vertices are computed based on the estimated change in the volume. The volume-preserving mesh smoothing brush effectively rounds the brushed area while approximately maintaining the volume of the 3D mesh.

One example embodiment of the present disclosure sets forth a method for smoothing a three-dimensional (3D) mesh. The method includes the steps of identifying a set of vertices within an area of the 3D mesh that is operated on by a volume-preserving mesh smoothing brush that is configured to smooth the 3D mesh and computing a modified position for each vertex in the set of vertices. A change in volume of the 3D mesh is estimated based on the modified positions computed for the vertices in the set of vertices. An updated position of the vertex is computed for each vertex in the set of vertices based on the modified position computed for the vertex and the estimated change in volume of the 3D mesh.

Another example embodiment of the present disclosure sets forth a computer readable storage medium containing a program for smoothing a three-dimensional (3D) mesh, which, when executed by a processing unit, cause a computer system to perform an operation comprising identifying a set of vertices within an area of the 3D mesh that is operated on by a volume-preserving mesh smoothing brush that is configured to smooth the 3D mesh and computing a modified position for each vertex in the set of vertices. A change in volume of the 3D mesh is estimated based on the modified positions computed for the vertices in the set of vertices. An updated position of the vertex is computed for each vertex in the set of vertices based on the modified position computed for the vertex and the estimated change in volume of the 3D mesh.

Yet another example embodiment of the present disclosure sets forth a computing system configured to smooth a three-dimensional (3D) mesh. The system includes a memory coupled to the processor, where the memory includes an application program that includes instructions that, when executed by the processor, cause the processor to identify a set of vertices within an area of the 3D mesh that is operated on by a volume-preserving mesh smoothing brush that is configured to smooth the 3D mesh and compute a modified position for each vertex in the set of vertices. A change in volume of the 3D mesh is estimated based on the modified positions computed for the vertices in the set of vertices. An updated position of the vertex is computed for each vertex in the set of vertices based on the modified position computed for the vertex and the estimated change in volume of the 3D mesh.

One advantage of the disclosed approach is that the volume-preserving mesh smoothing brush can be applied to a 3D mesh to smooth the mesh in real-time based on the estimated change in volume of the 3D mesh. During each smoothing iteration, the positions of the vertices are updated to smooth the 3D mesh while also approximately preserving the volume of the 3D mesh. The smoothing operation is interactive from the user's point of view since the updating of the vertex positions is immediate and can be seen by the user.

BRIEF DESCRIPTION OF THE DRAWINGS

So that the manner in which the above recited features can be understood in detail, a more particular description, briefly summarized above, may be had by reference to certain example embodiments, some of which are illustrated in the appended drawings. It is to be noted, however, that the appended drawings illustrate only typical embodiments and are therefore not to be considered limiting the scope of the claims, which may admit to other equally effective embodiments.

For clarity, identical reference numbers have been used, where applicable, to designate identical elements that are common between figures. It is contemplated that features of one example embodiment may be incorporated in other example embodiments without further recitation.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1A:
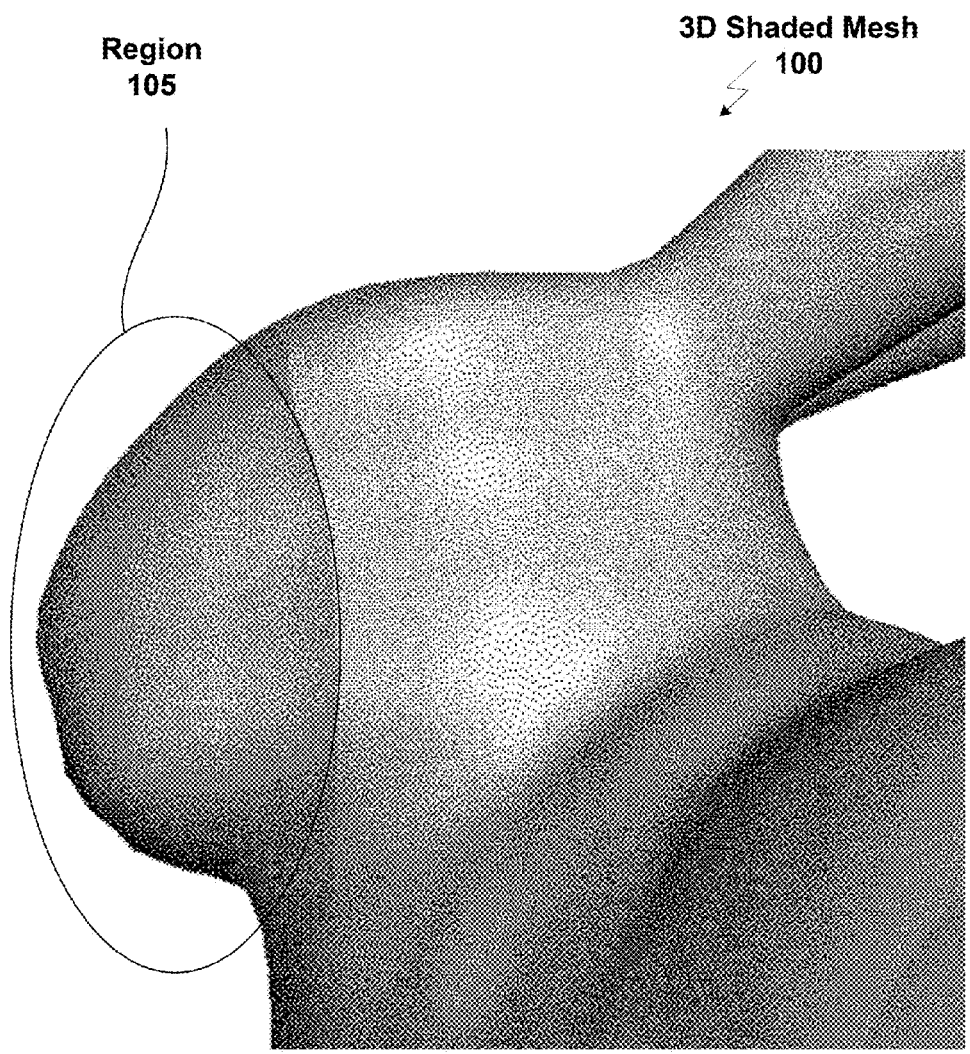
FIG. 1A illustrates a three-dimensional shaded mesh defined by vertices, according to the prior art.

FIG. 1A illustrates a 3D shaded mesh 100 defined by vertices, according to the prior art. The 3D shaded mesh 100 represents a nose of a bunny object. The region 105 to be smoothed is shown although the smoothing brush has not been applied to the 3D shaded mesh 100. The region 105 may be smoothed by applying the smoothing brush repeatedly since the area of the smoothing brush may not be large enough to cover the entire region 105 in a single application.

Figure 1B:
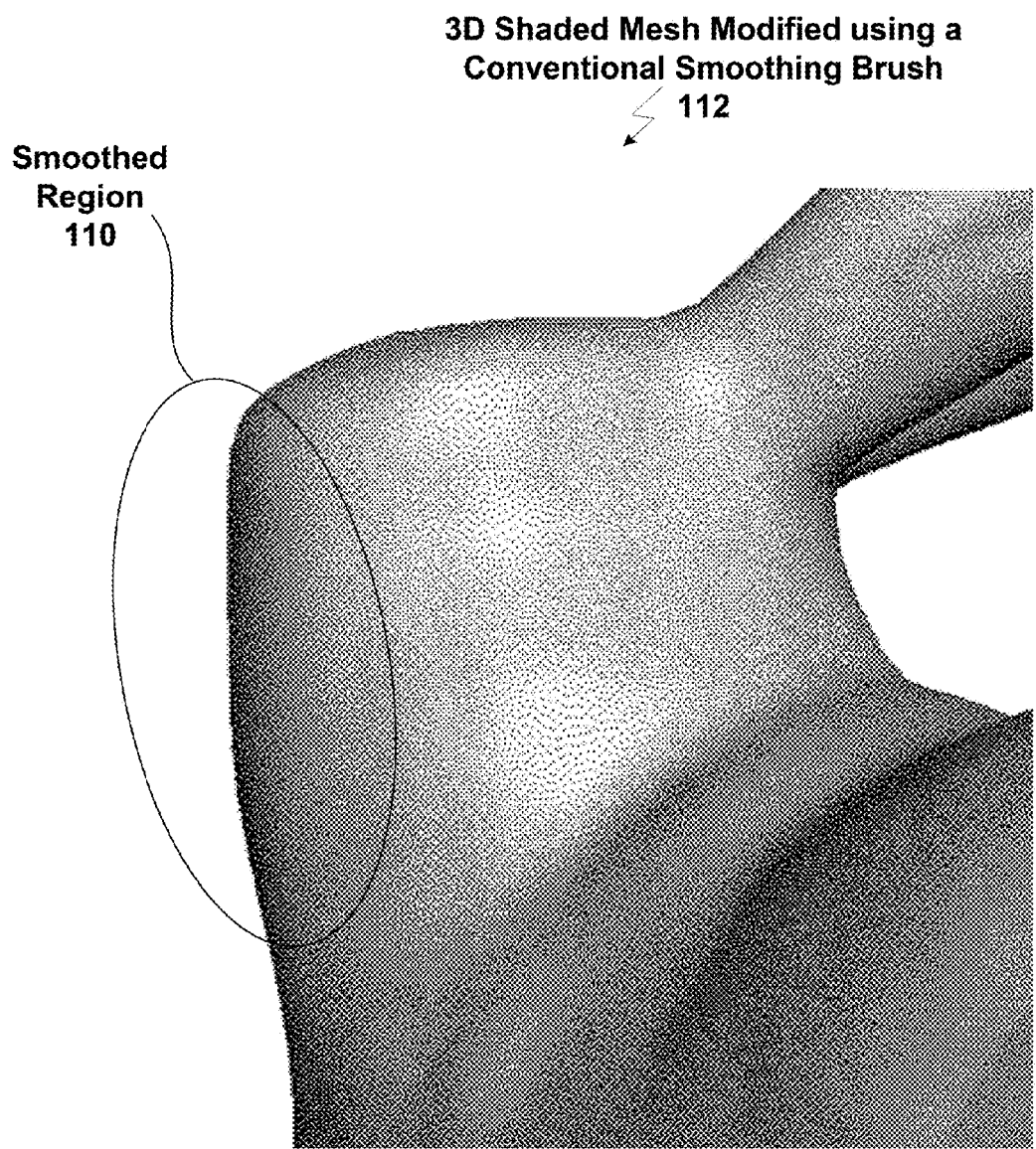
FIG. 1B illustrates the 3D shaded mesh of FIG. 1A after being modified using a conventional smoothing brush, according to the prior art.

FIG. 1B illustrates the 3D mesh 100 of FIG. 1A after being modified using a conventional smoothing brush, according to the prior art. The original 3D shaded mesh 100 is modified using the conventional smoothing brush to produce the 3D shaded mesh modified using a conventional smoothing brush 112. The type of smoothing used within the smoothed region 110 is referred to as Laplacian smoothing. The nose of the bunny has been smoothed in the smoothed region 110 for the 3D shaded mesh modified using a conventional smoothing brush 112. However, the nose in the 3D shaded mesh modified using a conventional smoothing brush 112 has also been flattened compared with the original 3D shaded mesh 100. The volume of the 3D object (bunny) has been reduced as a result of the smoothing operation.

Figure 1C:
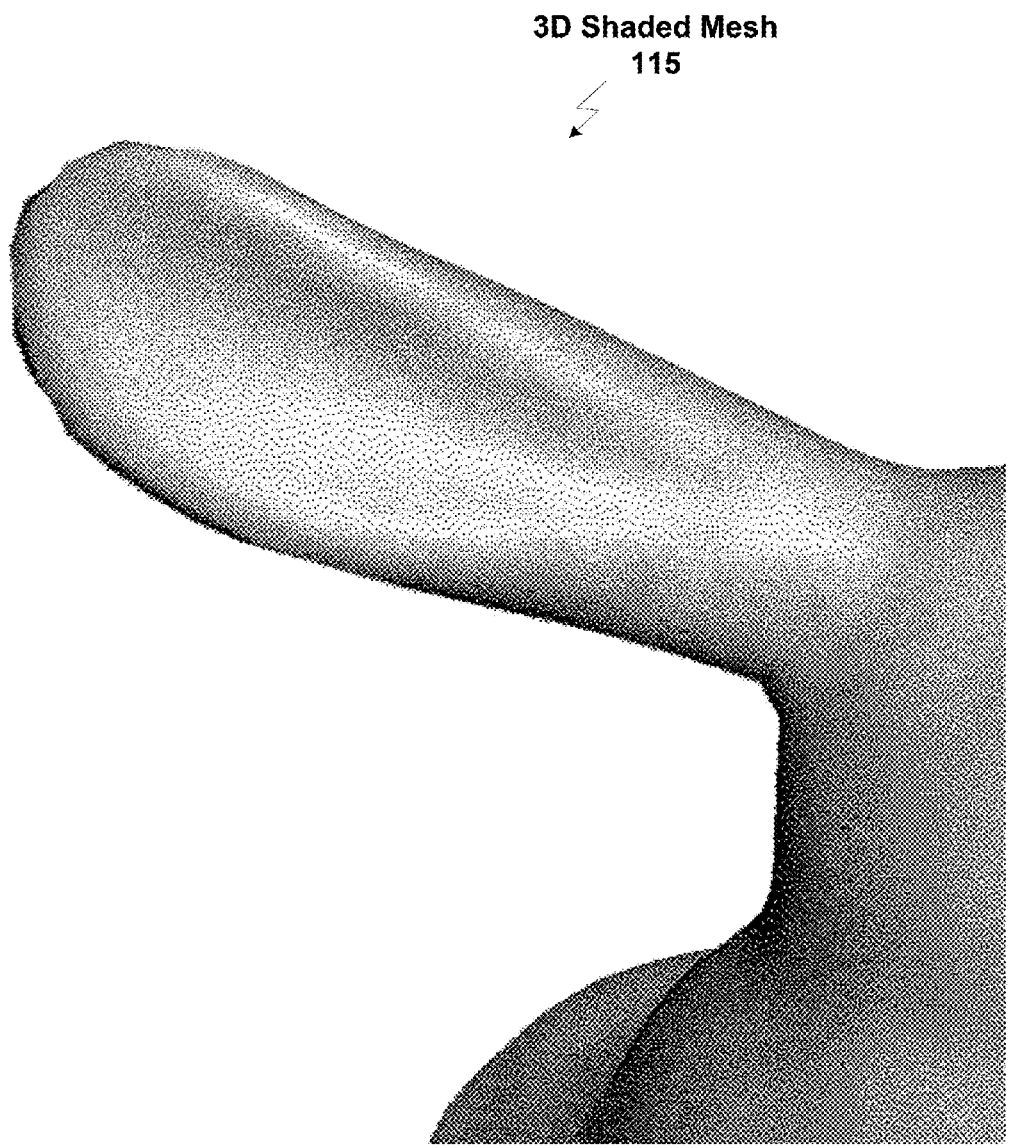
FIG. 1C illustrates another 3D shaded mesh defined by vertices, according to the prior art.

FIG. 1C illustrates another 3D shaded mesh 115 that is defined by vertices, according to the prior art. The 3D shaded mesh 115 represents an ear of the bunny object.

Figure 1D:
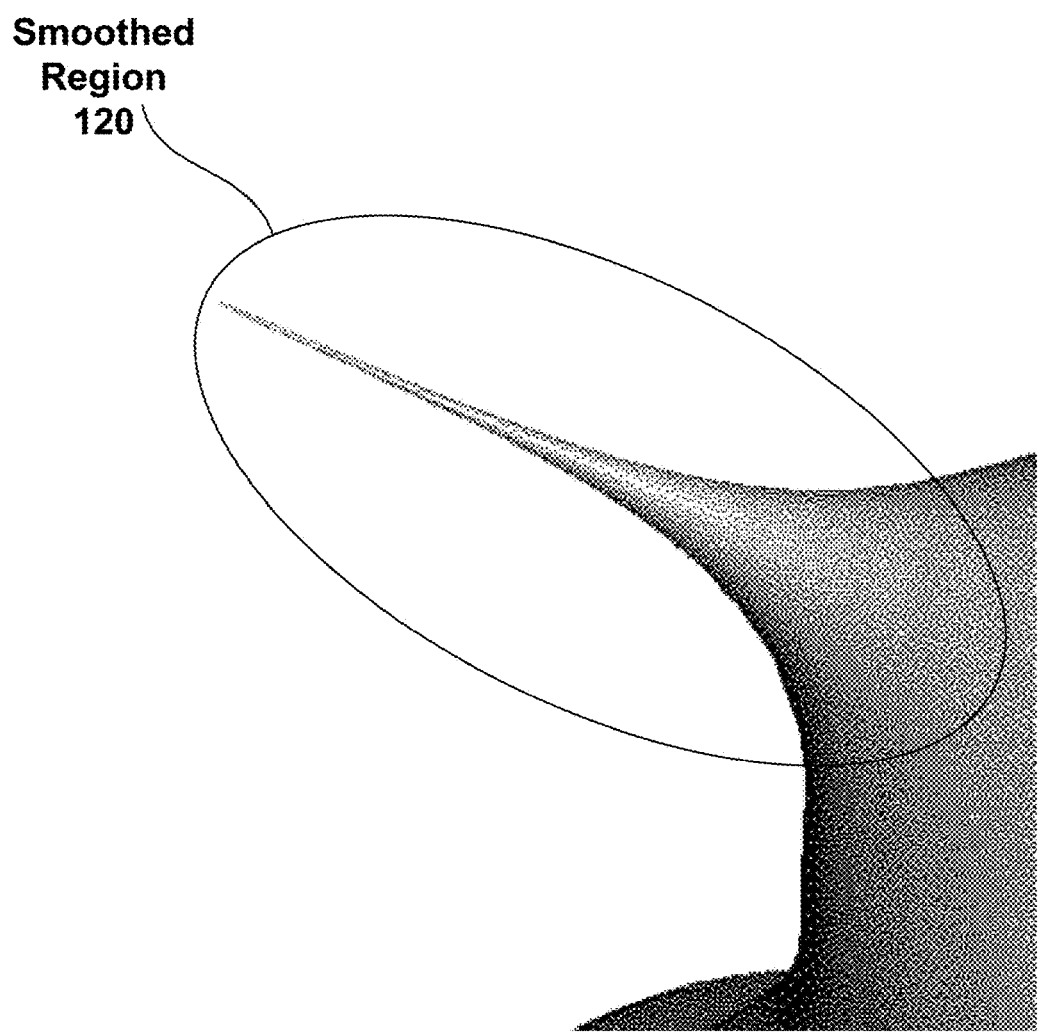
FIG. 1D illustrates the 3D shaded mesh of FIG. 1C after being modified using the conventional smoothing brush, according to the prior art.

FIG. 1D illustrates the 3D shaded mesh 115 of FIG. 1C after being modified using the conventional smoothing brush, according to the prior art. When the conventional smoothing brush is applied repeatedly to the ear of the bunny, the portion of the 3D shaded mesh 115 within the smoothed region 120 eventually collapses to a thin spike. Once the surface degenerates it is very difficult to repair the smoothed region 120 with further brushing operations. Again, the volume of the ear in the 3D shaded mesh modified using a conventional smoothing brush 125 has been reduced as a result of the smoothing operation.

The conventional smoothing brush has the effect of shrinking or flattening the brushed area of a 3D object. The mathematical mechanism behind the volume-preserving smoothing brush is to modify the position of the vertices while approximately preserving the volume of the 3D object. Therefore, the volume-preserving smoothing smoothes the 3D mesh while also inflating the smoothed 3D mesh to compensate for reductions in the volume of the 3D mesh.

Figure 1E:
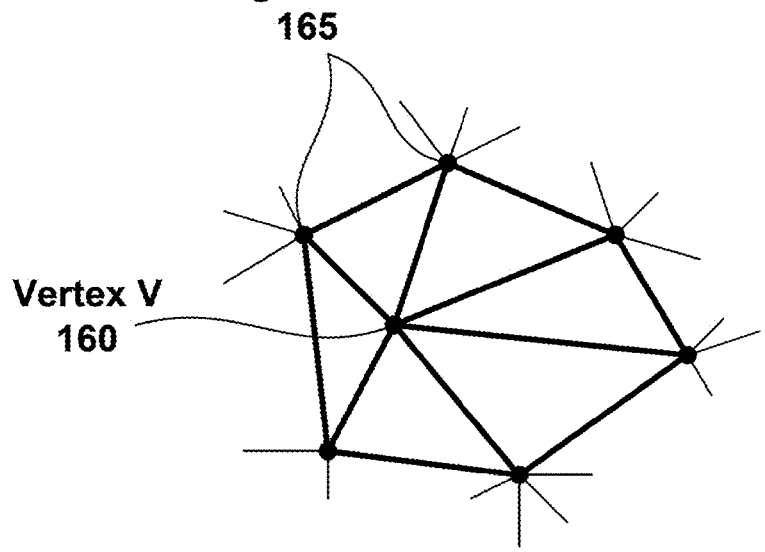
FIG. 1E illustrates a vertex of a three-dimensional mesh and one-ring of the vertex, according to the prior art.

FIG. 1E illustrates a vertex 160 of a 3D mesh and one-ring of the vertex 165, according to the prior art. For each vertex V 160 of the mesh, the set of vertices directly connected to the vertex by an edge is identified. The set of vertices is known as the one-ring of the vertex V 165. The one-ring of the vertex 165 includes six vertices that are each connected to the vertex V 160 by an edge. Then the weighted-sum of the positions of the neighbor vertices in the one-ring of the vertex 165 is computed. Uniform weights are used to compute the weighted centroid of the one-ring that is also referred to as the weighted one-ring sum, V'. For example, if there are N vertices in the one-ring of the vertex, a weight of 1/N is assigned to each vertex in the one-ring of the vertex. For the one-ring of the vertex 165 each vertex is assigned a weight of ⅙.

A difference vector, v, is computed as the difference between the weighted-sum V' and the vertex V, i.e., v=(V'−V). The new position of the vertex V 160 is computed as (V+k*v), where the parameter k is a fixed parameter that controls the rate of smoothing, and k is set to a constant value in the range [0,1]. The computations of V' and v may be iterated to produce an increasingly-smooth mesh.

Figure 1F:
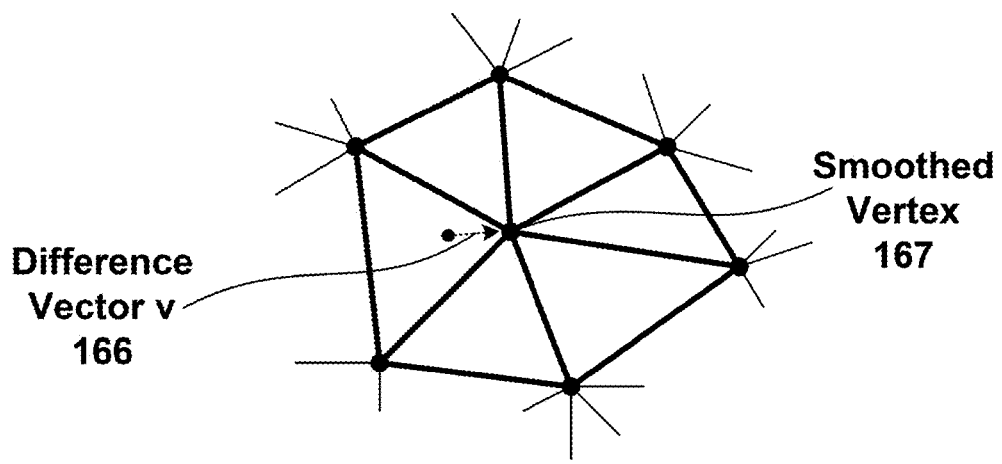
FIG. 1F illustrates the vertex of FIG. 1E modified using the conventional smoothing brush to produce a smoothed vertex, according to the prior art.

FIG. 1F illustrates the vertex V 160 of FIG. 1E modified using the conventional smoothing brush to produce a smoothed vertex 167, according to the prior art. The difference vector v 166 is computed and the vertex V 160 is moved to a new position according to the difference vector v 166 to produce the smoothed vertex 167.

Imagining a sphere, it is clear that smoothing using a conventional smoothing brush will shrink the 3D mesh representing the sphere, as the weighted centroid of each one-ring lies inside of the sphere. Moving the vertices toward the weighted centroid will effectively move each vertex inwards along the direction of the normal vector for each vertex. The volume-preserving mesh smoothing brush smoothes the 3D mesh while also inflating the 3D mesh to counter the shrinking effect of the smoothing operation.

Figure 2A:
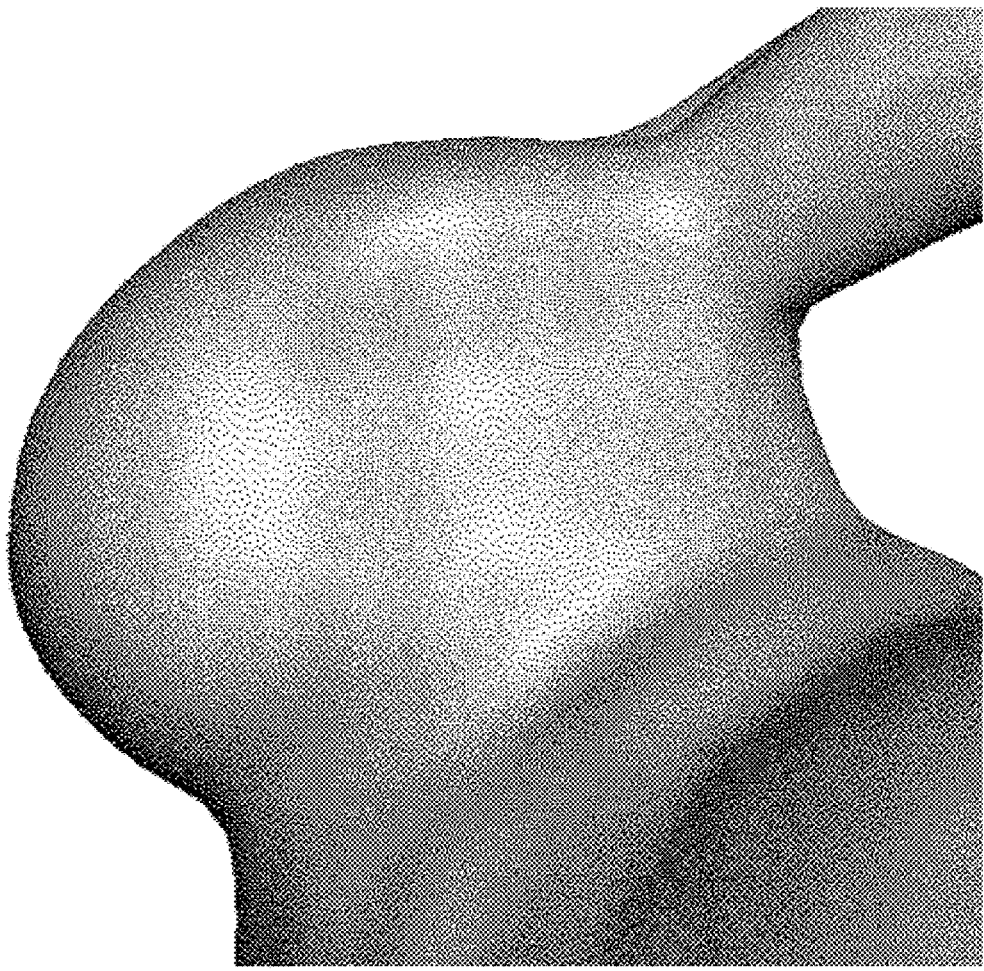
FIG. 2A illustrates the 3D shaded mesh of FIG. 1A modified using a volume-preserving mesh smoothing brush, according to one example embodiment of the present disclosure.

FIG. 2A illustrates a first view of the 3D shaded mesh of FIG. 1A modified using a volume-preserving mesh smoothing brush, according to one example embodiment of the present disclosure. In contrast with the 3D shaded mesh modified using a conventional smoothing brush 112 of FIG. 1B, the 3D shaded mesh modified using the volume-preserving mesh smoothing brush 200 does not significantly flatten the nose of the bunny. Instead of shrinking the nose, the volume-preserving mesh smoothing brush rounds the smoothed region of the 3D mesh representing the bunny.

Figure 2B:
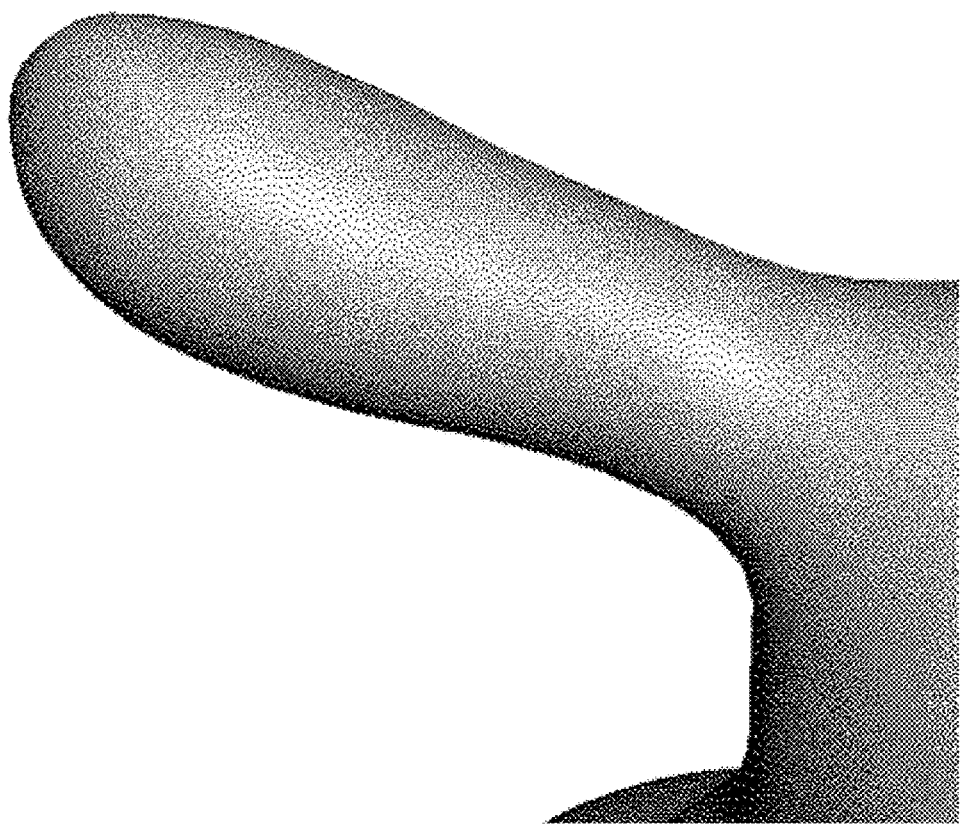
FIG. 2B illustrates the 3D shaded mesh of FIG. 1C modified using a volume-preserving mesh smoothing brush, according to one example embodiment of the present disclosure.

FIG. 2B illustrates the 3D shaded mesh 115 of FIG. 1C modified using a volume-preserving mesh smoothing brush, according to one example embodiment of the present disclosure. In contrast with the 3D shaded mesh modified using a conventional smoothing brush 125 of FIG. 1D, the 3D shaded mesh modified using the volume-preserving mesh smoothing brush 212 does not significantly reduce the volume of the ear of the bunny. In particular, the volume-preserving mesh smoothing brush does not cause the 3D mesh to collapse, forming a spike. Instead, the volume-preserving mesh smoothing brush maintains a smooth inflated shape that can easily be re-shaped using other 3D sculpting brushes.

To achieve volume-preserving smoothing, the average length of the Laplacian vectors v is computed for all vertices in the area of the 3D mesh that are operated on by the volume-preserving smoothing brush. The computed average length provides an estimate of the change in volume of the 3D mesh. Modified positions are computed for each vertex, V+k*v and normal vectors are estimated at the modified positions. The modified positions are then updated in the direction of the estimated normal vectors based on the estimated change in volume of the 3D mesh to inflate the 3D mesh.

The modified positions are also updated based on a falloff function defined for brush operations, an inflation strength, and a brush strength. The falloff function is a scalar function with the vertex position as an input. The falloff function may be specified for each smoothing brush. Generally, a smoothing brush incorporates a falloff function which defines how strongly the smoothing brush operation affects each vertex, with the falloff decreasing away from the center of the smoothing brush. In other words, the falloff function represents a filter that is applied by the smoothing brush. The inflation strength and the brush strength are values between 0 and 1, inclusive. A user may initiate a command using a toolbar to specify a radius or diameter of the volume-preserving mesh smoothing brush, a falloff function of the volume-preserving mesh smoothing brush, inflation strength, and/or a brush strength of the volume-preserving mesh smoothing brush.

In one embodiment, a user controls an input device, e.g., mouse, stylus, or the like, to position the volume-preserving mesh smoothing brush over a region of the 3D mesh to smooth the region. The application program causes a graphical representation of the volume-preserving mesh smoothing brush to be displayed. The 3D mesh is also displayed. The application program also updates the display as positions of the vertices are updated when the user applies the volume-preserving mesh smoothing brush to the 3D mesh to display the smoothed 3D mesh.

Figure 3A:
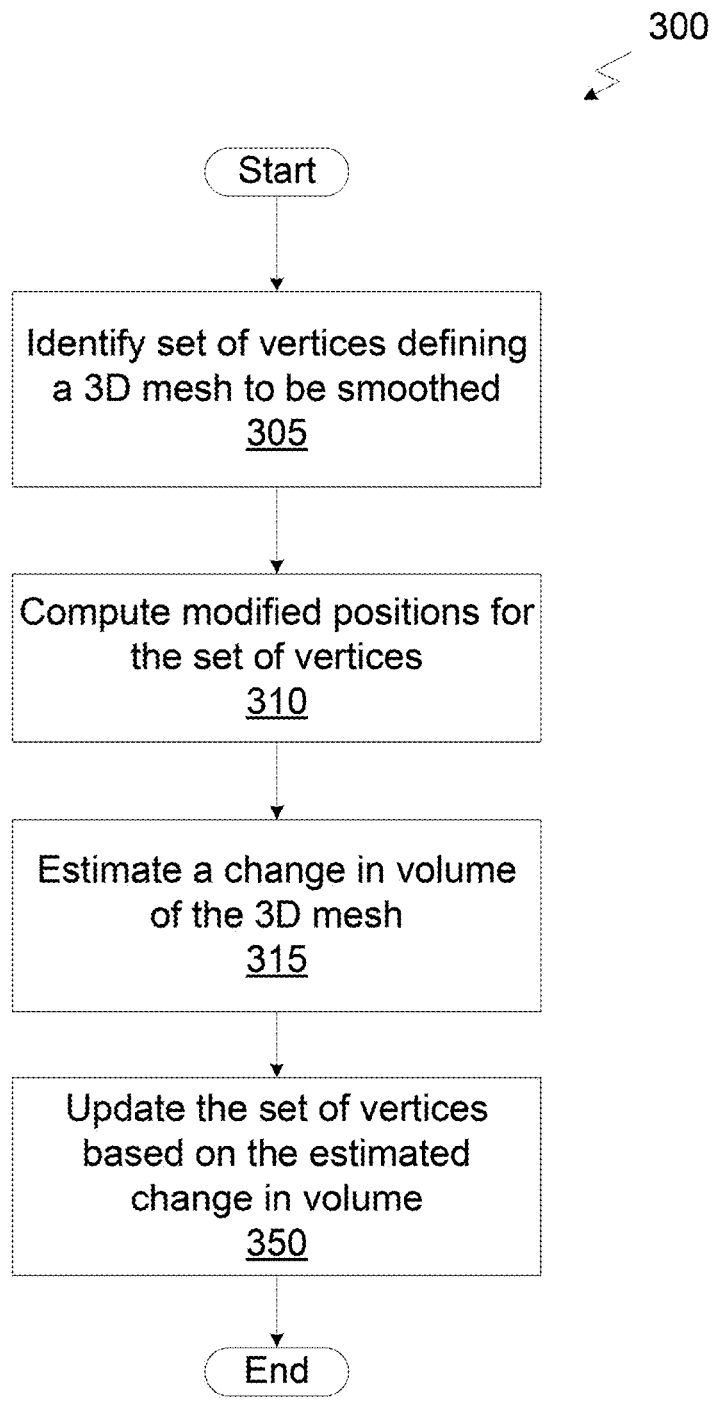
FIG. 3A is a flowchart of method steps for smoothing vertices of a 3D mesh using a volume-preserving mesh smoothing brush, according to one example embodiment of the present disclosure.

FIG. 3A is a flowchart of method steps 300 for smoothing vertices of a 3D mesh using a resolution-adaptive mesh smoothing brush, according to one example embodiment of the present disclosure. Persons skilled in the art will understand that any system configured to perform the method steps, in any order, is within the scope of the disclosure.

The method begins at step 305, where an application program configured to provide the volume-preserving mesh smoothing brush identifies a set of vertices within an area of a 3D mesh that is operated on by a volume-preserving mesh smoothing brush. In one embodiment, the area of the 3D mesh is the size of the resolution volume-preserving mesh smoothing brush. At step 310, the application program computes a modified position for each vertex in the set of vertices. At step 315 the application program estimates a change in volume of the 3D mesh based on the modified positions computed for the set of vertices. At step 350 the application program inflates the smoothed 3D mesh by updating the modified position of each vertex in the set of vertices according to the estimated change in volume of the 3D mesh. Steps 305, 310, 360, and 350 may be repeated for each movement of the volume-preserving mesh smoothing brush over the 3D mesh.

Figure 3B:
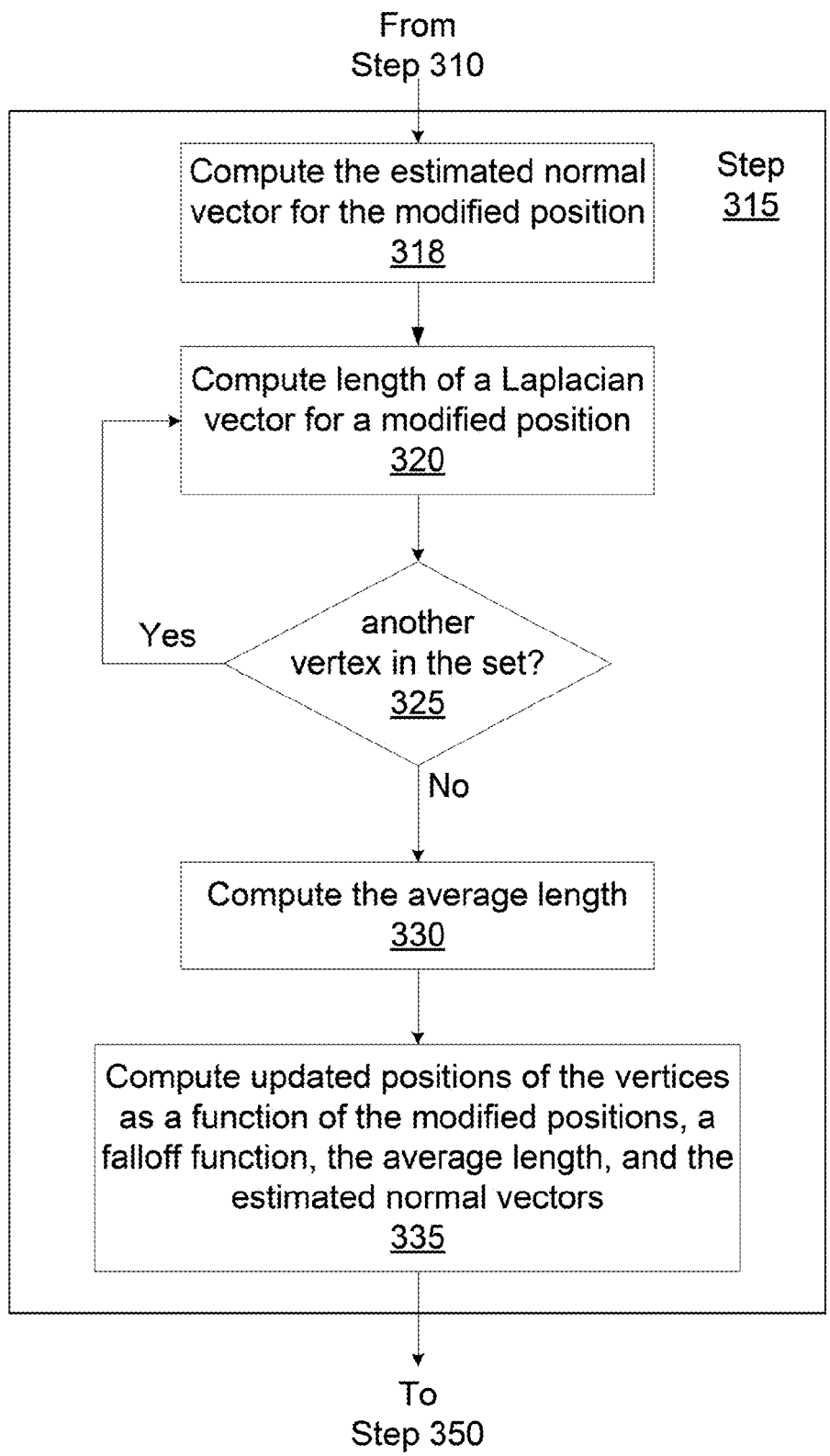
FIG. 3B is a flowchart of a method step shown in FIG. 3A for updating the set of vertices, according to one example embodiment of the present disclosure.

FIG. 3B is a flowchart of method step 315 shown in FIG. 3A, according to one example embodiment of the present disclosure. Persons skilled in the art will understand that any system configured to perform the method steps, in any order, is within the scope of the disclosure.

At step 318 the application program that is configured to provide the volume-preserving mesh smoothing brush estimates a normal vector for the modified position of a vertex, n_i=EstimateNormal(v_i), where v_i is the modified position of the vertex i. At step 320 the application program computes the length of a Laplacian vector for the modified position of a vertex in the set of vertices, Length(Laplacian (v_i)). At step 325 the application program determines if another vertex, having a modified position, is in the set of vertices, and, if so, step 320 is repeated. Otherwise, at step 330 the application program computes an average length for the set of vertices, where the average length is the average of the lengths computed at step 320, fAvgLen=mean(Length (Laplacian(v_i))), where Length is a function that computes the length of the Lapacian vector for v_i. The average length computed at step 330 provides an estimate of the change in volume of the 3D mesh.

At step 335 the updated positions of the vertices in the set are computed as a function of the modified positions, the falloff function, the average length, and the estimated normal vectors. Specifically, the updated position of a vertex v_i may be computed as v_i+Falloff(v_i)*fAvgLen* fInflate*n_i, where the v_i input is the modified position and the v_i that is generated is the updated position for the vertex. Falloff is the falloff function. fInflate is the product of fSmooth and the inflation strength, where fSmooth is the square of the brush strength. Once the updated positions of the vertices in the set are computed, the set of vertices is updated at step 350.

System Overview

Figure 4:
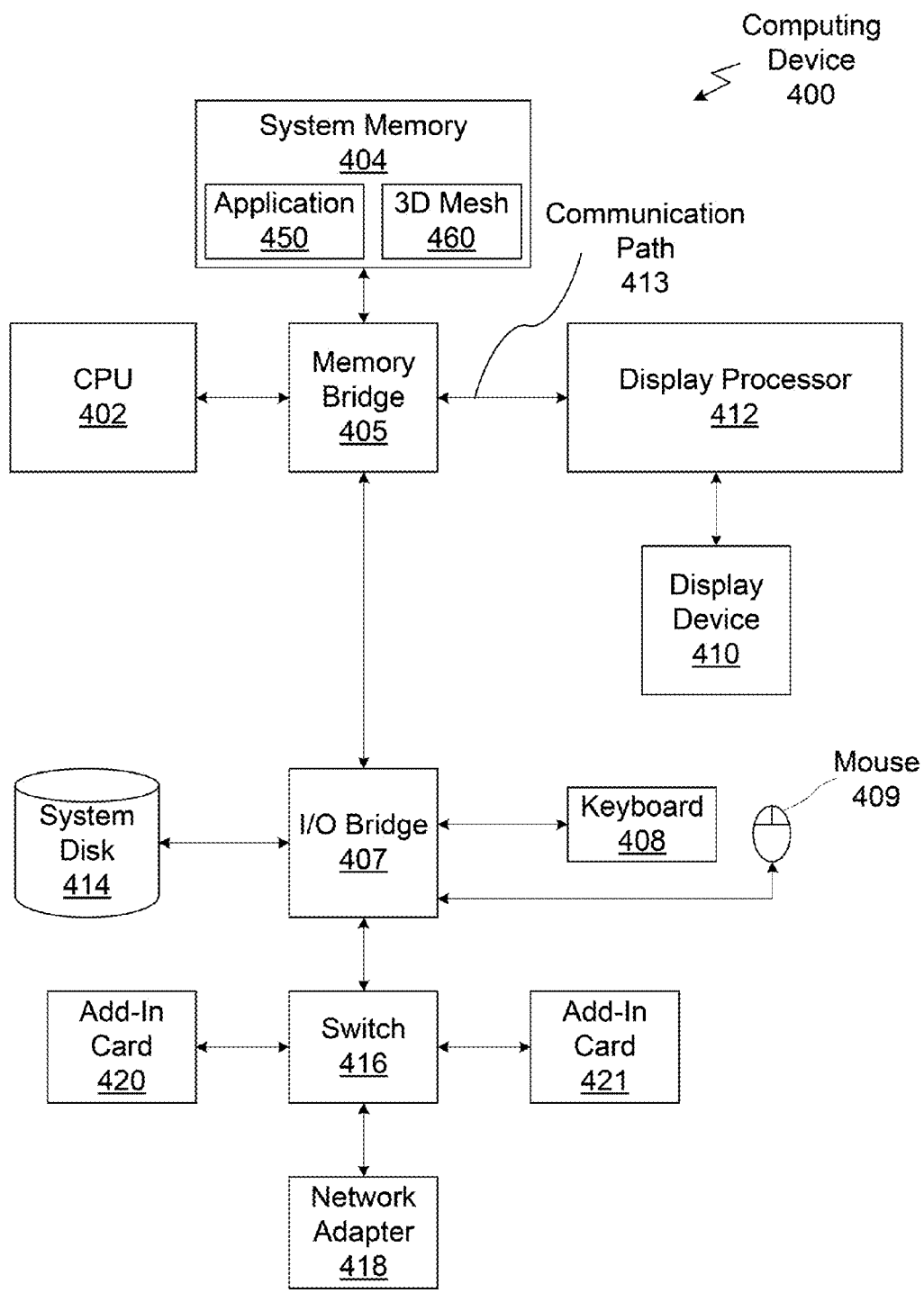
FIG. 4 is a block diagram of a computing device configured to implement one or more aspects of the present disclosure.

FIG. 4 is a block diagram of a computing device 400 configured to implement one or more aspects of the present disclosure. The computing device 400 may be configured to perform the method steps 300. In particular, an application 450 may be configured to apply the volume-preserving mesh smoothing brush to a 3D mesh 460, thereby performing one or more of the method steps 300.

Computing device 400 may be a computer workstation, personal computer, or any other device suitable for practicing one or more embodiments of the present invention. As shown, computing device 400 includes one or more processing units, such as central processing unit (CPU) 402, and a system memory 404 communicating via a bus path that may include a memory bridge 405. CPU 402 includes one or more processing cores, and, in operation, CPU 402 is the master processor of computing device 400, controlling and coordinating operations of other system components. System memory 404 stores software applications and data for execution or processing by CPU 402. CPU 402 runs software applications and optionally an operating system. Memory bridge 405, which may be, e.g., a Northbridge chip, is connected via a bus or other communication path (e.g., a HyperTransport link) to an I/O (input/output) bridge 407. I/O bridge 407, which may be, e.g., a Southbridge chip, receives user input from one or more user input devices such as keyboard 408 or mouse 409 and forwards the input to CPU 402 via memory bridge 405. In alternative embodiments, I/O bridge 407 may also be connected to other input devices such as a joystick, digitizer tablets, touch pads, touch screens, still or video cameras, motion sensors, and/or microphones (not shown).

One or more display processors, such as display processor 412, are coupled to memory bridge 405 via a bus or other communication path 413 (e.g., a PCI Express, Accelerated Graphics Port, or HyperTransport link); in one embodiment display processor 412 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 404. Display processor 412 periodically delivers pixels to a display device 410 that may be any conventional cathode ray tube, liquid crystal display, light-emitting diode display, or the like. Display processor 412 may be configured to provide display device 410 with either an analog signal or a digital signal.

A system disk 414 is also connected to I/O bridge 407 and may be configured to store content and applications and data for use by CPU 402 and display processor 412. System disk 414 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 416 provides connections between I/O bridge 407 and other components such as a network adapter 418 and various add-in cards 420 and 421. Network adapter 418 allows computing device 400 to communicate with other systems via an electronic communications network, and may include wired or wireless communication over local area networks and wide area networks such as the Internet.

Other components (not shown), including USB or other port connections, film recording devices, and the like, may also be connected to I/O bridge 407. For example, an audio processor may be used to generate analog or digital audio output from instructions and/or data provided by CPU 402, system memory 404, or system disk 414. Communication paths interconnecting the various components in FIG. 4 may be implemented using any suitable protocols, such as PCI (Peripheral Component Interconnect), PCI Express (PCIe), AGP (Accelerated Graphics Port), HyperTransport, or any other bus or point-to-point communication protocol(s), and connections between different devices may use different protocols, as is known in the art.

In one embodiment, display processor 412 incorporates circuitry optimized for graphics and video processing, including, for example, video output circuitry, and constitutes a graphics processing unit (GPU). In another embodiment, display processor 412 incorporates circuitry optimized for general purpose processing. In yet another embodiment, display processor 412 may be integrated with one or more other system elements, such as the memory bridge 405, CPU 402, and I/O bridge 407 to form a system on chip (SoC). In still further embodiments, display processor 412 is omitted and software executed by CPU 402 performs the functions of display processor 412.

CPU 402 provides display processor 412 with data and/or instructions defining the desired output images, from which display processor 412 generates the pixel data of one or more output images. The data and/or instructions defining the desired output images can be stored in system memory 404 or a graphics memory within display processor 412. In one embodiment, display processor 412 includes 3D rendering capabilities for generating pixel data for output images from instructions and data defining the geometry, lighting, shading, texturing, motion, and/or camera parameters for a scene. Display processor 412 can further include one or more programmable execution units capable of executing shader programs, tone mapping programs, and the like.

In one embodiment, application 450 and 3D mesh 460 are stored in system memory 404. Application 450 may be a CAD (computer aided design) application program configured to generate and display graphics data included in 3D mesh 460 on display device 410. For example, 3D mesh 460 could define one or more graphics objects that represent a 3D model of a house designed using the CAD system or a character for an animation application program. One example of application 450 is Autodesk® AutoCAD® software.

It will be appreciated that the computing device shown herein is illustrative and that variations and modifications are possible. The connection topology, including the number and arrangement of bridges, may be modified as desired. For instance, in some embodiments, system memory 404 may be connected to CPU 402 directly rather than through a bridge, and other devices may communicate with system memory 404 via memory bridge 405 and CPU 402. In other alternative topologies display processor 412 may be connected to I/O bridge 407 or directly to CPU 402, rather than to memory bridge 405. In still other embodiments, I/O bridge 407 and memory bridge 405 may be integrated in a single chip. In addition, the particular components shown herein are optional. For instance, any number of add-in cards or peripheral devices might be supported. In some embodiments, switch 416 is eliminated, and network adapter 418 and add-in cards 420, 421 connect directly to I/O bridge 407.

In sum, the present application describes a system and method for smoothing a 3D mesh using a volume-preserving mesh smoothing brush. An advantage of the disclosed approach is that the volume-preserving mesh smoothing brush can be applied to a 3D mesh to smooth the mesh based on the local vertex resolution. Another advantage is that the computations needed to implement the volume-preserving mesh smoothing brush may be performed in real-time. Therefore, the user is provided with appropriate real-time visual feedback that enables a user to perform smoothing operations while viewing the results of the smoothing operations.

While the foregoing is directed to certain example embodiments, other and further embodiments may be devised without departing from the basic scope thereof. For example, aspects of the embodiments may be implemented in hardware or software or in a combination of hardware and software. One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the aforementioned functions, are included as example embodiments.

In view of the foregoing, the scope of the present disclosure is determined by the claims that follow.

What is claimed is:

1. A method for smoothing a three-dimensional (3D) mesh, the method comprising:
   identifying a set of vertices within an area of the 3D mesh that is operated on by a volume-preserving mesh smoothing brush that is configured to smooth the 3D mesh;

for each vertex in the set of vertices, computing a modified position based on the operation of the volume-preserving mesh smoothing brush, and computing a length of a Laplacian vector corresponding to the modified position computed for the vertex;

computing, for the set of vertices, an average length based on the lengths of the Laplacian vectors computed for the vertices in the set of vertices;

estimating a change in volume of the 3D mesh based on the modified positions computed for the vertices in the set of vertices;

computing, for each vertex in the set of vertices, an updated position of the vertex based on the modified position computed for the vertex, the average length computed for the set of vertices, and the estimated change in volume of the 3D mesh; and inflating the 3D mesh based on the updated positions of the vertices, wherein the volume of the 3D mesh after being inflated is substantially the same as the volume of the 3D mesh before being operated on by the volume-preserving mesh smoothing brush.

2. The method of claim 1, wherein computing an updated position of a vertex is based on an estimated normal vector of the vertex at the modified position computed for the vertex.

3. The method of claim 1, wherein computing an updated position of a vertex is based on a fixed inflation strength parameter specified for the volume-preserving mesh smoothing brush.

4. The method of claim 1, wherein computing an updated position of a vertex is based on a falloff function that defines how strongly the volume-preserving mesh smoothing brush affects the vertex and that is specified for the volume-preserving mesh smoothing brush.

5. The method of claim 1, wherein computing the updated position of a vertex is based on a fixed smoothing rate parameter specified for the volume-preserving mesh smoothing brush.

6. A non-transitory computer-readable storage medium containing a program for smoothing a three-dimensional (3D) mesh, which, when executed by a processing unit, cause a computer system to perform an operation comprising:

identifying a set of vertices within an area of the 3D mesh that is operated on by a volume-preserving mesh smoothing brush that is configured to smooth the 3D mesh within a brush area of the volume-preserving mesh smoothing brush;

for each vertex in the set of vertices, computing a modified position based on the operation of the volume-preserving mesh smoothing brush;

estimating a change in volume of the 3D mesh based on the modified positions computed for the set of vertices;

computing, for each vertex in the set of vertices, an updated position of the vertex based on the modified position computed for the vertex and a product of an inflation strength and a falloff function that is based on the estimated change in volume of the 3D mesh and defines how strongly the volume-preserving mesh smoothing brush affects the vertex; and inflating the 3D mesh based on the updated positions of the vertices, wherein the volume of the 3D mesh after being inflated is substantially the same as the volume of the 3D mesh before being operated on by the volume-preserving mesh smoothing brush.

7. The non-transitory computer-readable storage medium of claim 6, further comprising:

for each vertex in the set of vertices, computing a length of a Laplacian vector corresponding to the modified position computed for the vertex; and computing, for the set of vertices, an average length based on the lengths of the Laplacian vector computed for the vertices in the set of vertices.

8. The non-transitory computer-readable storage medium of claim 7, wherein computing an updated position of a vertex is based on the average length computed for the set of vertices.

9. The non-transitory computer-readable storage medium of claim 6, wherein computing the updated position of the vertex is based on an estimated normal vector of the vertex at the modified position computed for the vertex.

10. The non-transitory computer-readable storage medium of claim 6, wherein computing the updated position of the vertex is based on a fixed smoothing rate parameter specified for the volume-preserving mesh smoothing brush.

11. A system for smoothing a three-dimensional (3D) mesh, the system comprising:

a processor; and a memory coupled to the processor, wherein the memory includes an application program that includes instructions that, when executed by the processor, cause the processor to:

identify a set of vertices within an area of the 3D mesh that is operated on by a volume-preserving mesh smoothing brush that is configured to smooth the 3D mesh within a brush area of the volume-preserving mesh smoothing brush;

for each vertex in the set of vertices, compute a modified position based on the operation of the volume-preserving mesh smoothing brush;

estimate a change in volume of the 3D mesh based on the modified positions computed for the set of vertices;

compute, for each vertex in the set of vertices, an updated position of the vertex based on the modified position computed for the vertex and a product of an inflation strength and a falloff function that is based on the estimated change in volume of the 3D mesh and defines how strongly the volume-preserving mesh smoothing brush affects the vertex; and inflate the 3D mesh based on the updated positions of the vertices, wherein the volume of the 3D mesh after being inflated is substantially the same as the volume of the 3D mesh before being operated on by the volume-preserving mesh smoothing brush.

12. The system of claim 11, wherein the application program includes further instructions that when executed by the processor, cause the processor to:

for each vertex in the set of vertices, compute a length of a Laplacian vector corresponding to the modified position computed for the vertex; and compute, for the set of vertices, an average length based on the lengths of the Laplacian vector computed for the vertices in the set of vertices.

13. The system of claim 12, wherein computing an updated position of a vertex is based on the average length computed for the set of vertices.

14. The system of claim 11, wherein computing an updated position of a vertex is based on an estimated normal vector of the vertex at the modified position.

15. The system of claim 11, further comprising a display device configured to display the 3D mesh, a graphical representation of the volume-preserving mesh smoothing brush, and the smoothed 3D mesh.

16. The computer-implemented method of claim 1, further comprising receiving input from an end-user indicating a smoothing operation to perform with the volume-preserving mesh smoothing brush on the 3D mesh.

17. The non-transitory computer-readable medium of claim 6, further comprising the steps of receiving input from an end-user indicating a smoothing operation to perform with the volume-preserving mesh smoothing brush on the 3D mesh.

18. The system of claim 11, wherein the application program includes further instructions that when executed by the processor, cause the processor to receive input from an end-user indicating a smoothing operation to perform with the volume-preserving mesh smoothing brush on the 3D mesh.

19. The method of claim 1, wherein inflating the 3D mesh comprises causing each vertex in the set of vertices to reside at a corresponding updated position.

20. The non-transitory computer-readable storage medium of claim 6, wherein computing the updated position of the vertex is based on a product of the estimated normal vector and the inflation strength.

21. The non-transitory computer-readable storage medium of claim 6, wherein computing the updated position of the vertex is based on a product of the falloff function computed at the updated position of the vertex and the square of the brush strength.

* * * * *